United States Patent [19]
Tanaka et al.

[11] Patent Number: 6,034,747
[45] Date of Patent: *Mar. 7, 2000

[54] ACTIVE MATRIX SUBSTRATE AND DISPLAY DEVICE INCORPORATING THE SAME

[75] Inventors: Shinya Tanaka, Sakai; Atsushi Ban, Soraku-gun; Takayuki Shimada, Yamatokoriyama; Mikio Katayama, Ikoma, all of Japan

[73] Assignee: Sharp Kabushiki Kaisha, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/720,152

[22] Filed: Sep. 25, 1996

[30] Foreign Application Priority Data

Sep. 27, 1995 [JP] Japan ................................. 7-249977
Sep. 19, 1996 [JP] Japan ................................. 8-247933

[51] Int. Cl.[7] .................... G02F 1/1343; G02F 1/136; G02F 1/1333
[52] U.S. Cl. ........................ 349/43; 349/38; 349/42; 349/44; 349/111
[58] Field of Search .................. 349/111, 39, 44, 349/38, 42, 43

[56] References Cited

U.S. PATENT DOCUMENTS

| | | | |
|---|---|---|---|
| 4,103,297 | 7/1978 | McGreivy et al. | 349/43 |
| 4,648,691 | 3/1987 | Oguchi et al. | 349/38 |
| 5,032,883 | 7/1991 | Wakai et al. | |
| 5,166,085 | 11/1992 | Wakai et al. | 437/40 |
| 5,499,123 | 3/1996 | Mikoshiba | 349/44 |
| 5,500,750 | 3/1996 | Kanbe et al. | 349/42 |
| 5,585,951 | 12/1996 | Noda et al. | 349/122 |
| 5,641,974 | 6/1997 | den Boer et al. | |

FOREIGN PATENT DOCUMENTS

| | | | |
|---|---|---|---|
| 0 117 957 | 9/1984 | European Pat. Off. | 349/43 |
| 61-156025 | 7/1986 | Japan . | |
| 1-35351 | 7/1989 | Japan . | |
| 4307521 | 10/1992 | Japan . | |
| 4-74714 | 11/1992 | Japan . | |
| 6-230422 | 8/1994 | Japan . | |

OTHER PUBLICATIONS

Society for Information Display International Symposium Digest of Technical Papers, vol. XXVI, Walt Disney World Dophin Hotel, Orlando, Florida May 23–25, 1995, S.S.Kim et al, 4:3: High Aperture and Fault–Tolerant Pixel Structure for TFT–LCDs, pp. 15–18.

Fujita et al, "Colorless Polyimide", Nitto Giho, vol. 29, No. 1, pp. 20–28, 1991.

Sakamoto et al, "27.3: A High–Aperture–Ratio 3–in.–Diagonal VGA a–Si Light Valve with Pixel/Data and Pixel/Gate Lines Overlapping", SID 96 Digest, pp. 681–684, 1996.

Kim et al, "4:3 High–Aperture and Fault–Tolerant Pixel Structure For TFT–LCDs", SID 95 DIGEST, pp. 15–18, 1995.

*Primary Examiner*—William L. Sikes
*Assistant Examiner*—Julie Ngo
*Attorney, Agent, or Firm*—Nixon & Vanderhye P.C.

[57] ABSTRACT

An active matrix substrate includes a gate line, a source line, and a thin film transistor provided in the vicinity of an intersection between the gate line and the source line. The thin film transistor includes a gate electrode connected to the gate line, a source electrode connected to the source line, and a drain electrode connected to a pixel electrode. An interlayer insulating film is provided over the thin film transistor, the gate line, and the source line. The pixel electrode is provided on the interlayer insulating film, and is connected to the drain electrode via a contact hole formed in the interlayer insulating film. A conductive layer extends over a channel region of the thin film transistor via the interlayer insulating film.

19 Claims, 14 Drawing Sheets

ACTIVE MATRIX SUBSTRATE AND DISPLAY DEVICE INCORPORATING THE SAME

RELATED APPLICATIONS

This application is related to the following commonly assigned co-pending applications: Ser. No. 08/695,632, filed Aug. 12, 1996; Ser. No. 08/712,978 now U.S. Pat. No. 5,877,830, filed Sep. 12, 1996; Ser. No. 08/700,172, filed Aug. 20, 1996; Ser. No. 08/697,277, filed Aug. 27, 1996; Ser. No. 08/705,759, filed Aug. 30, 1996 now U.S. Pat. No. 5,831,708; and Ser. No. 08/725,663, filed Oct. 1, 1996 now U.S. Pat. No. 5,771,083.

BACKGROUND OF THE INVENTION

1. Field of the Invention

The present invention relates to an active matrix substrate used for a display device, e.g., a liquid crystal display device, and a display device incorporating the active matrix substrate.

2. Description of the Related Art

A liquid crystal display device is known which includes an active matrix substrate (having an equivalent circuit shown in FIG. 10) as one of a pair of substrates interposing a liquid crystal layer. The active matrix substrate includes thin film transistors 2 (hereinafter referred to as "TFTs") for controlling the turning on/off of pixel electrodes, the TFTs 2 being arranged in a matrix. A gate line 3 is coupled to a gate electrode of each TFT 2, so that the TFT 2 is driven in accordance with a signal provided via the gate line 3. A source line 5 is coupled to a source electrode of each TFT 2, so that a video signal or the like provided via the source line 5 is input to the corresponding pixel electrode (via the source electrode and drain electrode of the TFT 2) while the TFT 2 is maintained ON by a signal applied to the gate line 3. One of the terminals of a pixel capacitance 1 (a plurality of which constitute a matrix) is coupled to the drain electrode of each TFT 2. The other terminal of each pixel capacitance 1 is coupled to a pixel capacitance line 4. When a liquid crystal cell is formed by interposing a liquid crystal layer between the active matrix substrate and a counter substrate, the pixel capacitance line 4 is coupled to an opposing electrode formed on the counter substrate.

FIG. 14 is a plan view showing an active matrix substrate having the above-mentioned equivalent circuit. FIG. 15 is a cross-sectional view taken at line B–B' in FIG. 14 (corresponding to one pixel portion). FIG. 16 is a plan view showing a TFT portion on the active matrix substrate. The active matrix substrate is composed essentially of a transparent insulating substrate 10 having source lines 5 and gate lines 3 formed thereon, with a TFT 2 being formed in the vicinity of each intersection of the source lines 5 and gate lines 3.

As shown in FIG. 15, the TFT 2 is formed on a gate electrode 11, which extends from the gate line 3. A gate insulating film 12 is coated over the gate electrode 11. A semiconductor layer 13 is formed on the gate insulating film 12 above where the gate electrode 11 is formed. A channel protection film 14 is further formed on the semiconductor layer 13 above where the gate electrode 11 is formed. A source electrode 15a and a drain electrode 15b (both composed of an n$^+$Si layer) are formed on the semiconductor layer 13 and the gate insulating film 12, the source electrode 15a and the drain electrode 15b being disrupted from each other at the channel protection film 14. A transparent conductive film 16' is formed so as to partially overlap the source electrode 15a and the drain electrode 15b. A metal layer 16 is formed on the transparent conductive film 16'. Thus, the transparent conductive film 16' and the metal layer 16 on the source electrode 15a side constitute a double-layered source line.

An interlayer insulating film 17 and a pixel electrode 6 (within a bold line) formed of a transparent conductive layer are formed in this order on the above-described substrate. Both the interlayer insulating film 17 and the pixel electrode 6 extend over an area wider than the TFT 2 itself. The pixel electrode 6 is coupled to the drain electrode 15b of the TFT 2 via a contact hole 7 through the interlayer insulating film 17.

On the active matrix substrate having the above configuration, the interlayer insulating film 17 exists between the pixel electrode 6 and the gate line/source line. As a result, it is possible to lay out the pixel electrode 6 so as to overlap the gate line and/or the source line, thereby improving the aperture ratio of the display device and shielding any electric field arising due to the signal lines. Such a structure is disclosed, for example, in Japanese Laid-Open Patent Publication No. 58-172685.

However, the above-mentioned conventional active matrix substrate including inverse-staggered TFTs has a problem in that the characteristics thereof drastically change with the lapse of time during which a voltage is applied to the TFTs (hereinafter referred to as "voltage application time").

FIG. 11 is a graph illustrating the OFF-characteristics of the TFTs assuming a case where a black image is displayed all across the display. In FIG. 11, the abscissa axis shows the voltage application time for the TFTS, and the ordinate axis shows the low level (Vgl) of the potential of the gate line. The graph was obtained by varying the low level (Vgl) of the gate line while applying a signal of ±3.5 V to the source line and plotting levels at which the displayed image reversed to a white image.

As seen from FIG. 11, a larger value of Vgl provides a larger margin in the OFF-characteristics of the TFTs. For example, when a conventional active matrix substrate (shown by curve A) is driven under the condition Vgl=−8V, the active matrix substrate starts malfunctioning (i.e., the black image reverses to a white image) after 200 hours of voltage application, indicating the substrate's life being only so many hours. Such an active matrix substrate clearly does not withstand the actual use. This deterioration in the OFF-characteristics is especially marked in the case where a thin organic film is used as the interlayer insulating film.

Moreover, the active matrix substrate is subject to a "haziness" phenomenon (i.e., in a NW (normally-white display mode) the displayed image appearing more whitened than is normal) in response to any shift in the OFF-characteristic of the TFTS. This phenomenon considerably deteriorates the display quality of the device.

SUMMARY OF THE INVENTION

An active matrix substrate according to the present invention including: a gate line; a source line; and a thin film transistor provided in the vicinity of an intersection between the gate line and the source line, the thin film transistor including a gate electrode connected to the gate line, a source electrode connected to the source line, and a drain electrode connected to a pixel electrode. An interlayer insulating film is provided over the thin film transistor, the gate line, and the source line, and the pixel electrode is provided on the interlayer insulating film, the pixel electrode being connected to the drain electrode via a contact hole formed in the interlayer insulating film. Finally, a conductive layer is formed so as to oppose a channel region of the thin film transistor via the interlayer insulating film.

In one embodiment of the invention, the conductive layer is electrically connected to the drain electrode.

In another embodiment of the invention, the conductive layer is electrically connected to the source electrode.

In still another embodiment of the invention, the conductive layer is in a floating state.

In still another embodiment of the invention, the conductive layer is formed of a transparent conductive material.

In still another embodiment of the invention, the conductive layer formed of a light-intercepting conductive material.

In still another embodiment of the invention, the conductive layer is formed of a portion of the pixel electrode.

In still another embodiment of the invention, the conductive layer is formed so as to at least partially overlap both the source electrode and the drain electrode via the interlayer insulating film.

In still another embodiment of the invention, the interlayer insulating film is formed of an organic material.

In still another embodiment of the invention, the counter substrate includes a color filter layer which does not include a black matrix.

A display device according to the present invention includes: the active matrix substrate of any of the previous embodiments, a display medium layer, and a counter substrate, the counter substrate opposing the active matrix substrate with the display medium layer interposed therebetween.

According to the present invention, a channel region of a TFT, which is formed in the vicinity of an intersection of a gate line and a source line, is covered by a pixel electrode or alternatively by a separate electrode formed on an interlayer insulating film. As a result, the deterioration in the OFF-characteristics of the TFT during the application of a voltage thereto can be minimized. Thus, the life of the substrate is improved, and high reliability with a large margin (i.e., long life before deterioration) in the OFF-characteristics can be provided. As a result, the "haziness" phenomenon due to any shift in the OFF-characteristics of the TFTs can be prevented, thereby leading to higher display quality.

The electrode covering the channel region of the TFT can be electrically separate from other electrodes.

By employing a metal layer as an electrode covering the channel region of the TFT, leakage of light in the channel region of the TFT can be effectively prevented. As a result, it becomes possible to realize a color display device employing a color filter which does not require a black matrix.

Thus, the invention described herein makes possible the advantages of: (1) providing an active matrix substrate having a longer lifetime by minimizing the deterioration in the characteristics of TFTs occurring with the lapse of time during which a voltage is applied to the TFTs; and (2) providing a display device incorporating the active matrix substrate.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of examples, with reference to the accompanying figures.

EXAMPLE 1

Figure 1:
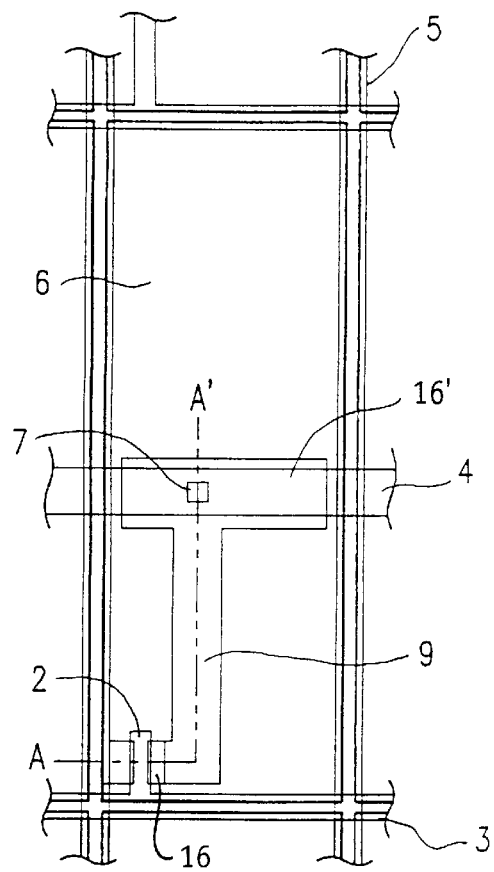
FIG. 1 is a plan view illustrating an active matrix substrate according to Example 1 of the present invention.
Figure 2:
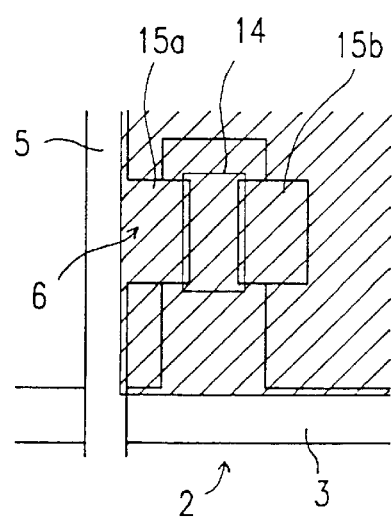
FIG. 2 is a plan view illustrating a TFT portion of the active matrix substrate shown in FIG. 1.
Figure 3:
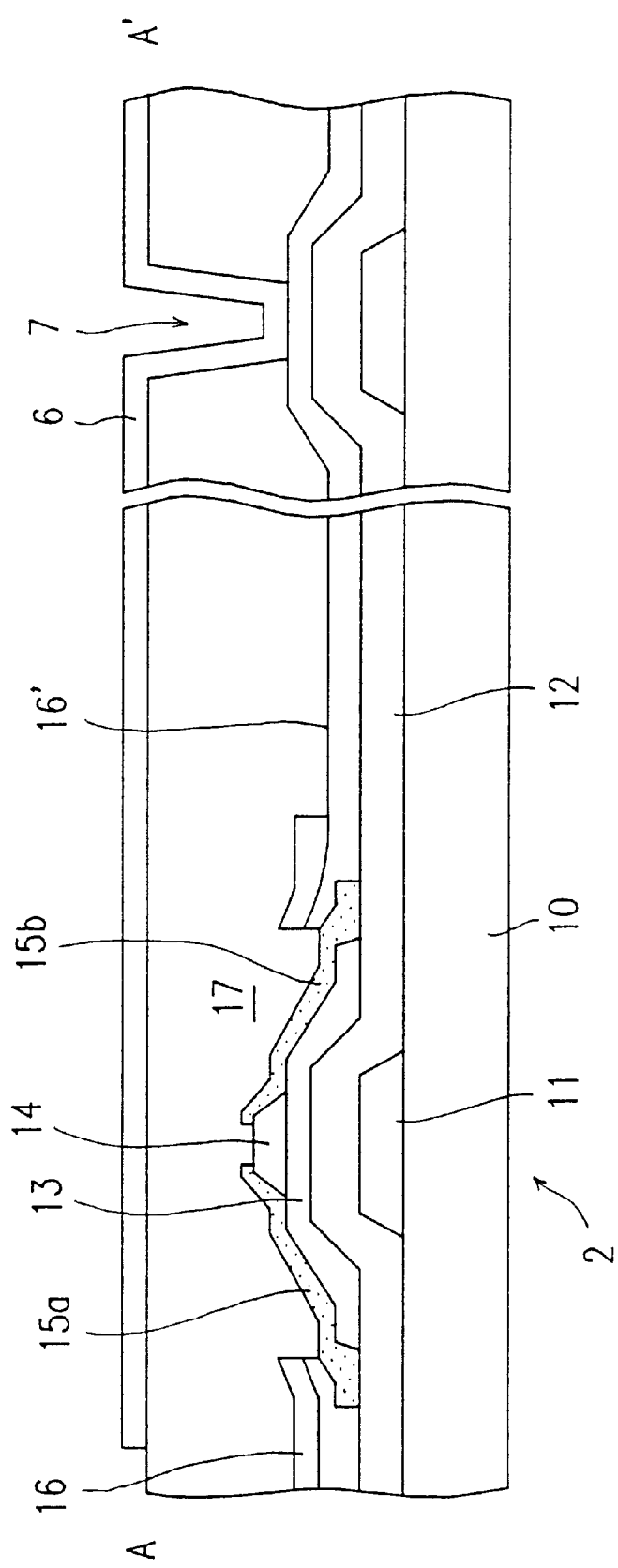
FIG. 3 is a cross-sectional view taken at line A–A' in FIG. 1.

FIG. 1 is a plan view showing an active matrix substrate according to Example 1 of the present invention. FIG. 2 is a plan view showing a TFT portion of the active matrix substrate. FIG. 3 is a cross-sectional view taken at line A–A' in FIG. 1 (corresponding to one pixel portion).

The active matrix substrate is composed essentially of a transparent insulating substrate 10 having source lines 5 (i.e., signal lines for supplying data signals) and gate lines 3 (i.e., scanning lines for supplying scanning signals) formed thereon, with a TFT 2 being formed in the vicinity of each intersection of the gate lines 3 and the source lines 5.

As shown in FIG. 3, the TFT 2 is formed on a gate electrode 11, which extends from the gate line 3. A gate insulating film 12 is coated over the gate electrode 11. A semiconductor layer 13 is formed on the gate insulating film 12 above where the gate electrode 11 is formed. A channel protection film 14 is further formed on the semiconductor layer 13 above where the gate electrode 11 is formed.

A source electrode 15a and a drain electrode 15b (both composed of an n+Si layer) are formed on the semiconductor layer 13 and the gate insulating film 12, the source electrode 15a and the drain electrode 15b being disconnected from each other at the channel protection film 14. A transparent conductive film 16' is formed so as to partially overlap the source electrode 15a and the drain electrode 15b. A metal layer 16 is formed on the transparent conductive film 16'. Thus, the transparent conductive film 16' and the metal layer 16 on the source electrode 15a side constitute a double-layered source line.

An interlayer insulating film 17 (composed of an organic material such as an acrylic resin or polyimide) and a pixel electrode 6 formed of a transparent conductive layer are formed in this order on the above-described substrate. Both the interlayer insulating film 17 and the pixel electrode 6 extend over an area wider than the TFT 2 itself. The pixel electrode 6 is coupled to the drain electrode 15b of the TFT 2 via a contact hole 7 through the interlayer insulating film 17. The pixel electrode 6 is formed so as to cover the TFT 2 and at least partially overlap the source line 5 and the gate line 3 in a peripheral portion thereof.

Thus, in the above-mentioned active matrix substrate, the pixel electrode 6 formed of a transparent conductive layer is electrically connected to the transparent conductive film 16' (which in turn is electrically connected to the drain electrode 15b of the TFT 2) via the contact hole 7 through the interlayer insulating film 17. Moreover, the pixel electrode 6 covers a channel region of the TFT 2. In accordance with this structure, all of the liquid crystal molecules above and around the TFT 2 can be oriented (as well as in the vicinity of the pixel electrode 6), thereby increasing the aperture ratio.

Figure 11:
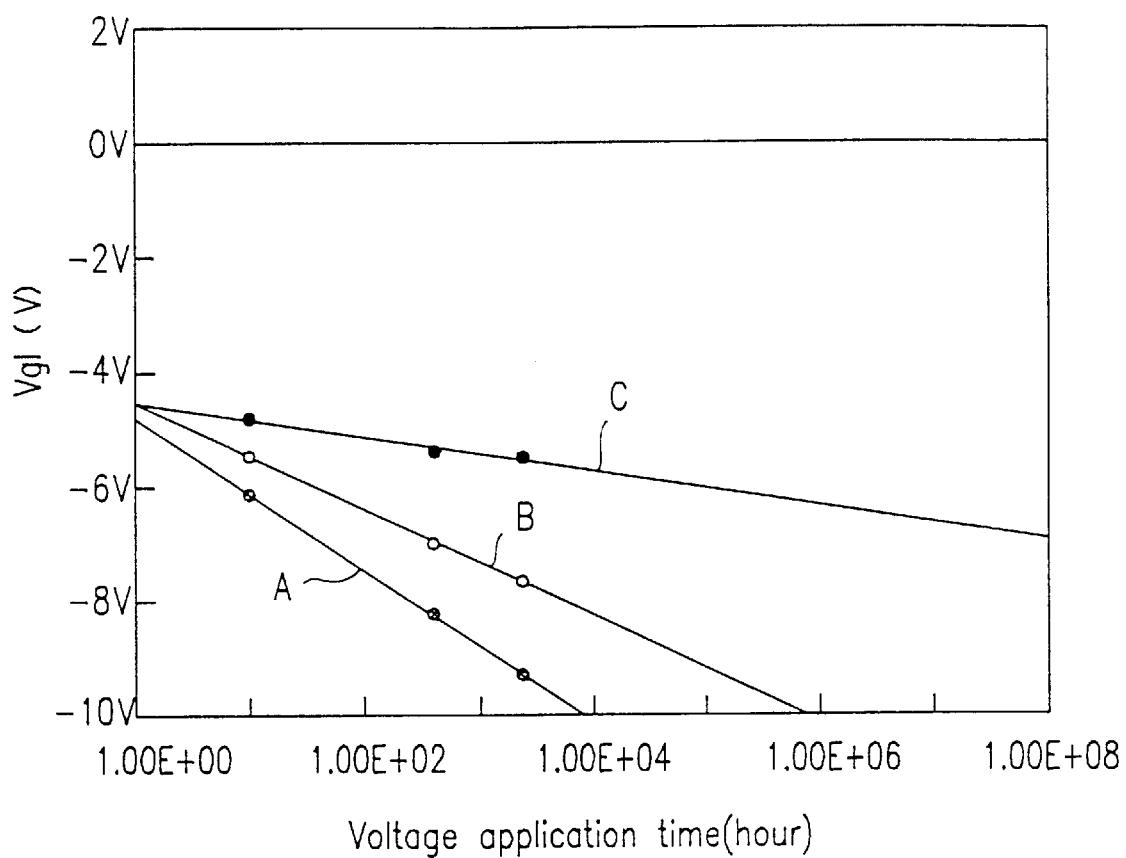
FIG. 11 is a graph illustrating the relationship between the voltage application time and the low level (Vgl) of the potential of a gate line with respect to an active matrix substrate according to an example of the present invention and a conventional active matrix substrate.

The deterioration of the TFT characteristics of the above active matrix substrate during actual operation is shown by curve B in FIG. 11. As seen from curve B of FIG. 11, the OFF-characteristics of the TFT have a relatively small amount of deterioration during operation due to the electrode (i.e., extension of the pixel electrode 6) formed above the channel region of the TFT 2 via the interlayer insulating film 17, the electrode having the same potential as that of the drain electrode 15b of the TFT 2. The reason why the deterioration of the OFF-characteristics of the TFT 2 is reduced is that the electrode formed over the channel region of the TFT 2 functions to subdue a so-called "charge up" phenomenon occurring above the channel region of the TFT 2 due to charges being induced at the interface between the interlayer insulating film 17 and a PI (polyimide alignment film) or a liquid crystal during the application of a voltage. Thus, the "haziness" phenomenon, which would typically arise due to a shift in the OFF-characteristics, can be effectively prevented, thereby improving the display quality.

A liquid crystal display device constructed by interposing a liquid crystal layer between the above-described active matrix substrate and a counter substrate is highly reliable.

EXAMPLE 2

Figure 4:
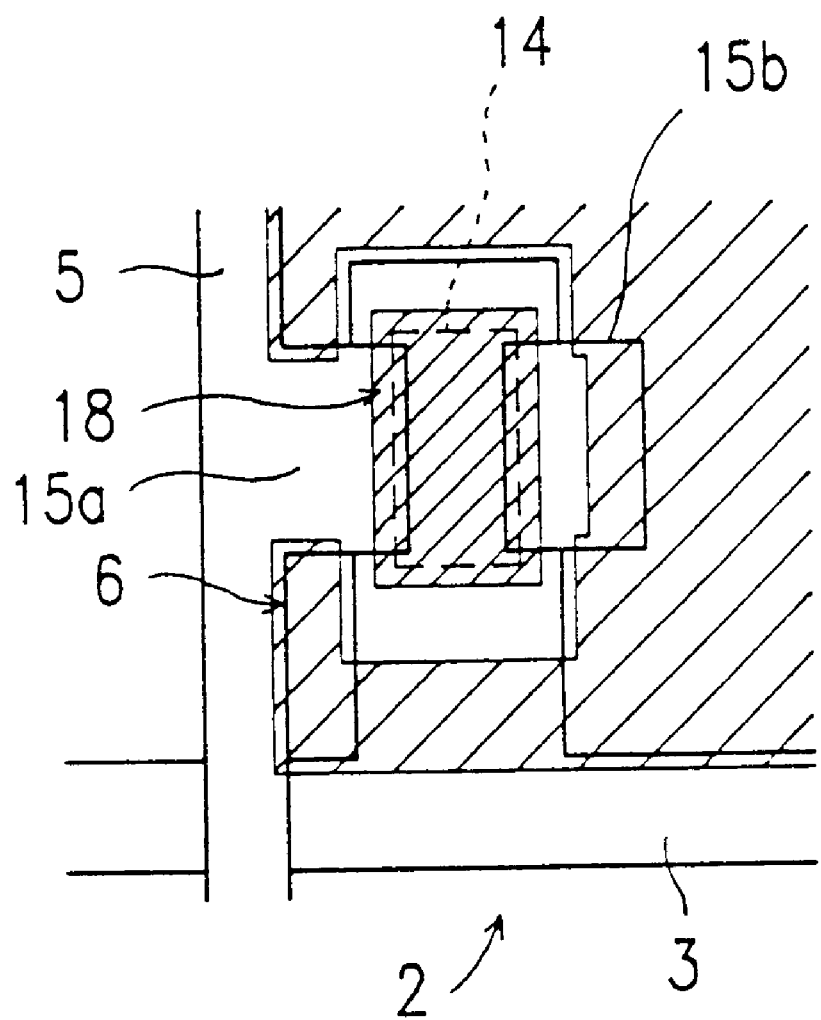
FIG. 4 is a plan view illustrating an active matrix substrate according to Example 2 of the present invention.
Figure 5:
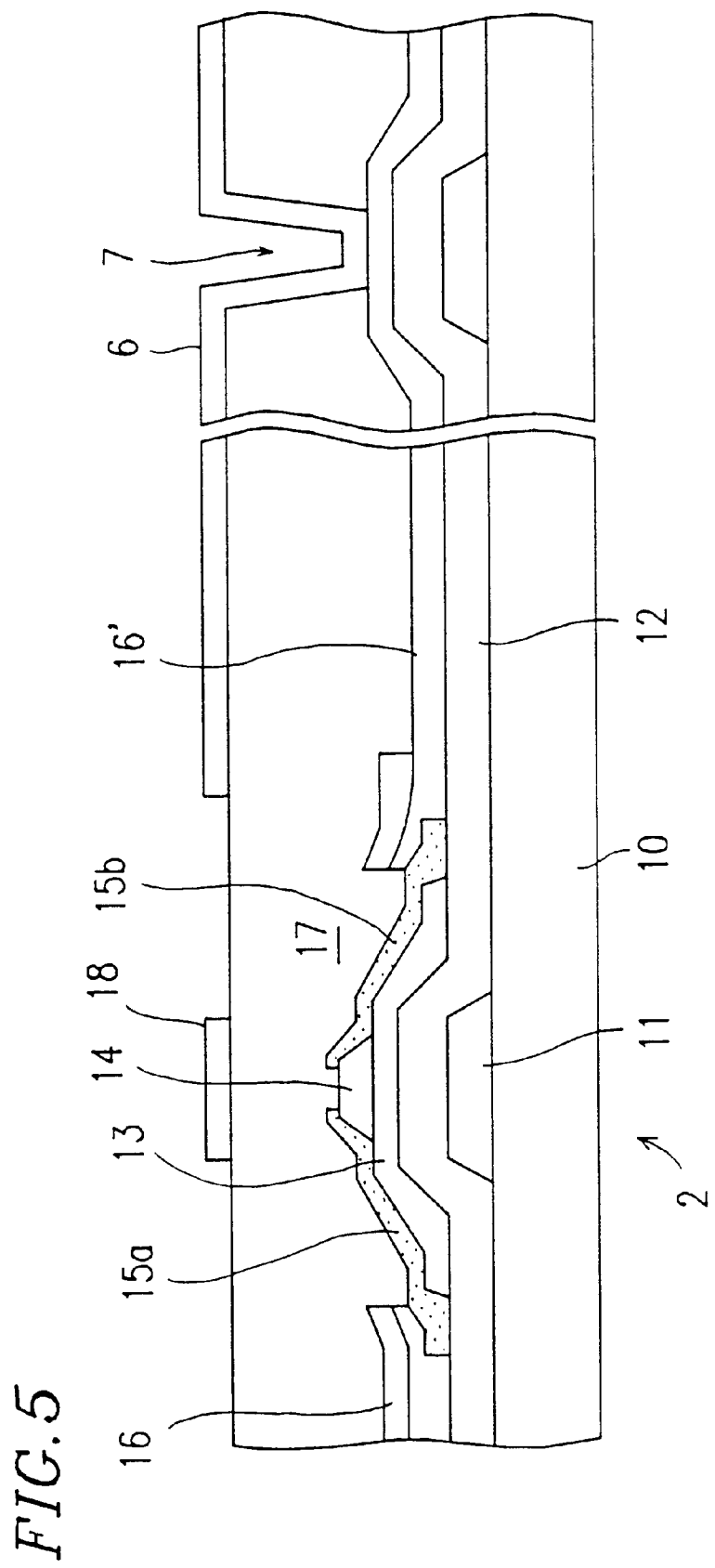
FIG. 5 is a cross-sectional view illustrating the active matrix substrate according to Example 2, showing a thereof corresponding to that shown in FIG. 3.

FIG. 4 is a plan view showing an active matrix substrate according to Example 2 of the present invention. FIG. 5 is a cross-sectional view showing a TFT portion of the active matrix substrate. In FIGS. 4 and 5, constituent elements which also appear in FIGS. 1 to 3 are indicated by like numerals as used therein.

In the active matrix substrate of the present example, a pixel electrode 6 formed of a transparent conductive layer is electrically connected to a transparent conductive film 16' (which in turn is electrically connected to a drain electrode 15b of a TFT 2) via the contact hole 7 through the interlayer insulating film 17. Moreover, the pixel electrode 6 at least partially overlaps the source line 5 and the gate line 3 in a peripheral portion thereof. Furthermore, an electrode 18 formed of a transparent conductive layer, which is electrically separate from the pixel electrode 6, is provided so as to cover at least the channel region of the TFT 2. The electrode 18 can be formed so as to cover not only the channel region of a semiconductor layer 13 but also a part or the whole of a source electrode 15a and the drain electrode 15b. The active matrix substrate otherwise has the same construction as that of the active matrix substrate of Example 1.

The deterioration of the TFT characteristics of the above active matrix substrate during actual operation (voltage application) is shown by curve C in FIG. 11. As seen from curve C of FIG. 11, the OFF-characteristics of the TFT have an even smaller deterioration during operation than in Example 1 due to the electrode 18 above the channel region of the TFT 2 being in a floating state (being electrically separate from other electrodes).

The reason why the deterioration of the OFF-characteristics of the TFT 2 is reduced is that the interlayer insulating film 17 formed of an organic film does not come into contact with a polyimide (PI) film as an alignment film or a liquid crystal material (LC) above the channel region of the TFT 2, thereby subduing the "charge up" phenomenon due to electrostatic charges. Furthermore, the electrically separate electrode 18 can be made to overlap the source electrode 15a and the drain electrode 15b of the TFT 2 so as to provide an appropriate capacitance component, so that the electrode 18 has an intermediate potential which reflects the balance between electrodes (e.g., the source electrode 15a, the drain electrode 15b, and a counter substrate interposing a liquid crystal layer with the active matrix substrate), thereby further alleviating the charge-up phenomenon. Thus, the "haziness" phenomenon, which would typically arise due to a shift in the OFF-characteristics, can be effectively prevented, thereby improving the display quality. It will be appreciated, however, that the electrically separate electrode 18 also has some capacitance component in the case where the electrode 18 does not overlap the source electrode 15a and the drain electrode 15b, thereby increasing the reliability of the active matrix substrate relative to that of a conventional active matrix substrate.

In the above-mentioned structure, a larger decrease in the deterioration of the OFF-characteristics of TFTs can be attained than in the case of Example 1. However, the aperture ratio becomes lower according to Example 2 than in the case of Example 1 because light leaking from the region where the electrode 18 is separated from the pixel electrode 6 must be intercepted. Either structure can be suitably selected according to the particular purposes of each display device and in view of the display characteristics and reliability to be attained thereby.

The above-described effect was also attained in the case where the electrode 18 covering the channel region was set at the same potential as that of the source line.

EXAMPLE 3

Hereinafter, an active matrix substrate according to Example 3 of the present invention will be described. In the present example, the electrode 18 in a floating state formed of a transparent conductive film in Example 2 is formed of a metal film, thereby intercepting light in the channel region of the TFT.

Figure 6:
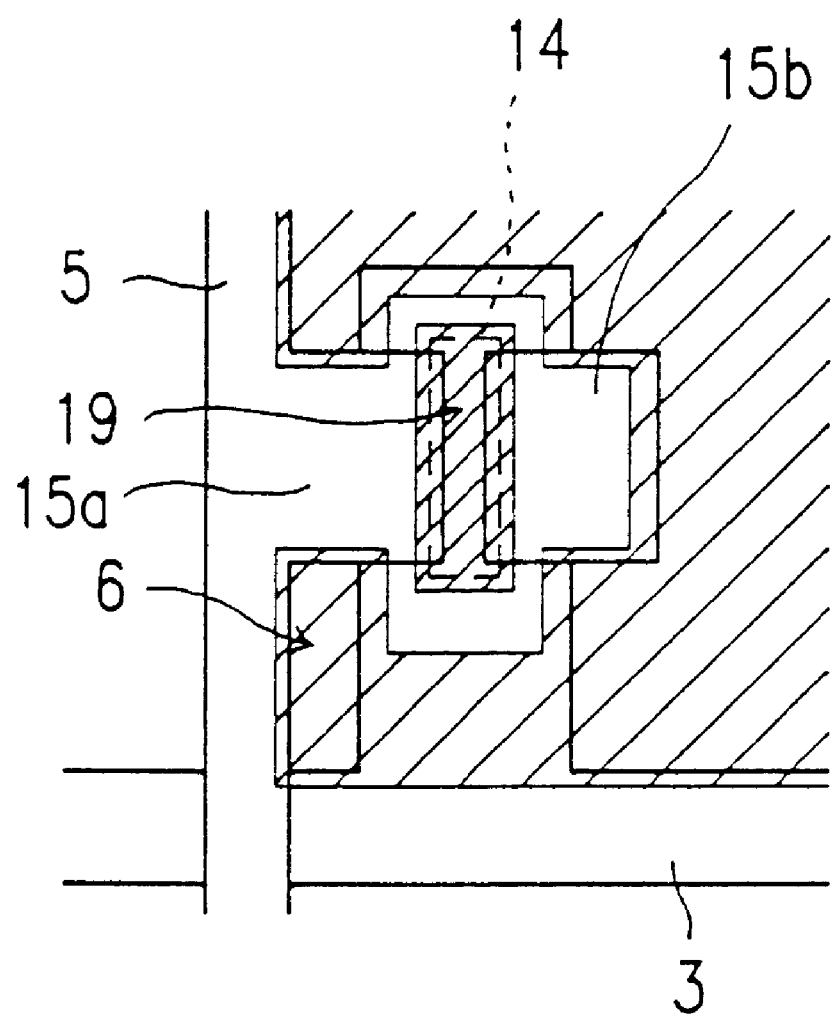
FIG. 6 is a plan view illustrating a TFT portion of an a active matrix substrate according to Example 3 of the present invention.
Figure 7:
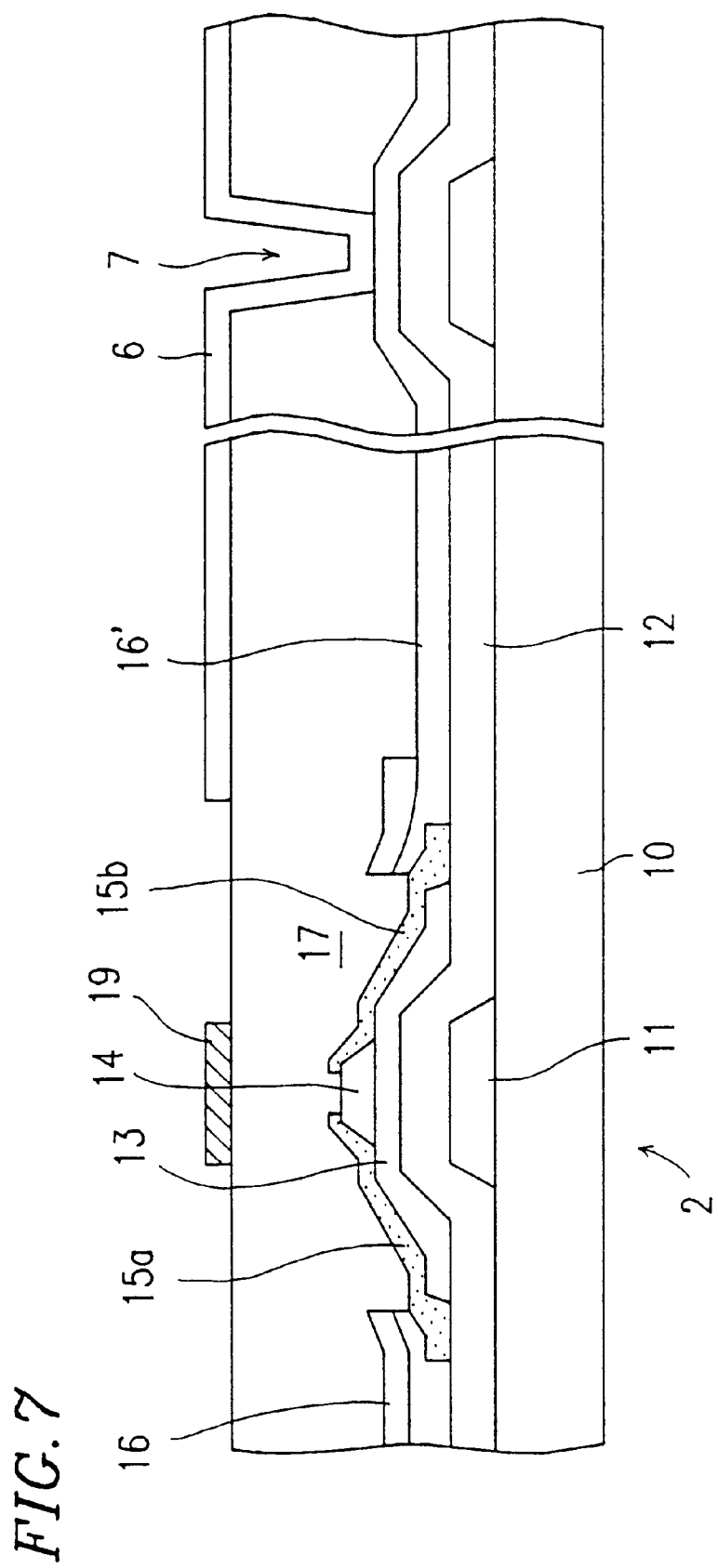
FIG. 7 is a cross-sectional view illustrating the active matrix substrate according to Example 3, showing a portion thereof corresponding to that shown in FIG. 3.

FIG. 6 is a plan view showing an active matrix substrate according to Example 3 of the present invention. FIG. 7 is a cross-sectional view showing a TFT portion of the active matrix substrate. In FIGS. 6 and 7, constituent elements which also appear in FIGS. 4 and 5 are indicated by like numerals as used therein.

In the active matrix substrate of the present example, a pixel electrode 6 is formed in a manner similar to the manner the pixel electrode 6 of Example 2 is formed, and a separate electrode 19 formed of a metal film is provided so as to cover at least the channel region of a TFT 2, the electrode 19 thus intercepting light in the channel region of the TFT 2. The active matrix substrate otherwise has the same construction as that of the active matrix substrate of Example 2.

According to the present example, the metal film 19 can intercept light in the channel region of the TFT 2. Moreover, the pixel electrode 6 at least partially overlaps the source line 5 and the gate line 3 in a peripheral portion thereof. Therefore, it is possible to use a color filter without any black matrices as a filter provided on a counter electrode on a counter substrate (interposing a display medium, e.g., liquid crystal, with the above-mentioned active matrix substrate). In other words, the metal film 19, the source line 5, and the gate line 3 function as a black matrix. In this case, the display device is of a transmission type with the counter substrate side being the front face (i.e., the face observed by a viewer). Moreover, the metal electrode 19 further alleviates (relative to Example 1) the charge-up phenomenon as in the case of Example 2 (where the separate electrode 18 composed of a transparent conductive film was used), thereby improving the reliability of the active matrix substrate.

EXAMPLE 4

Hereinafter, an active matrix substrate according to Example 4 of the present invention will be described.

Figure 8:
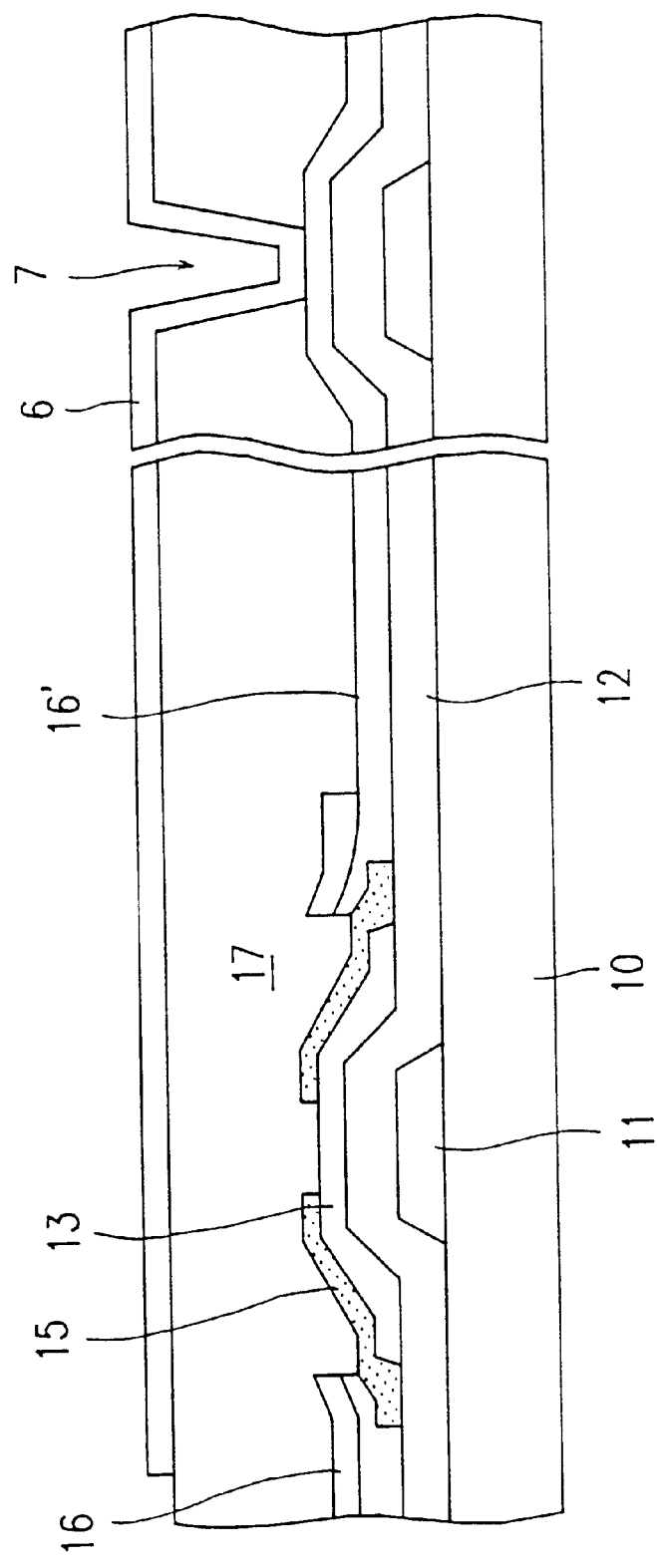
FIG. 8 is a cross-sectional view illustrating an active matrix substrate according to Example 4, showing a portion thereof corresponding to that shown in FIG. 3.
Figure 9:
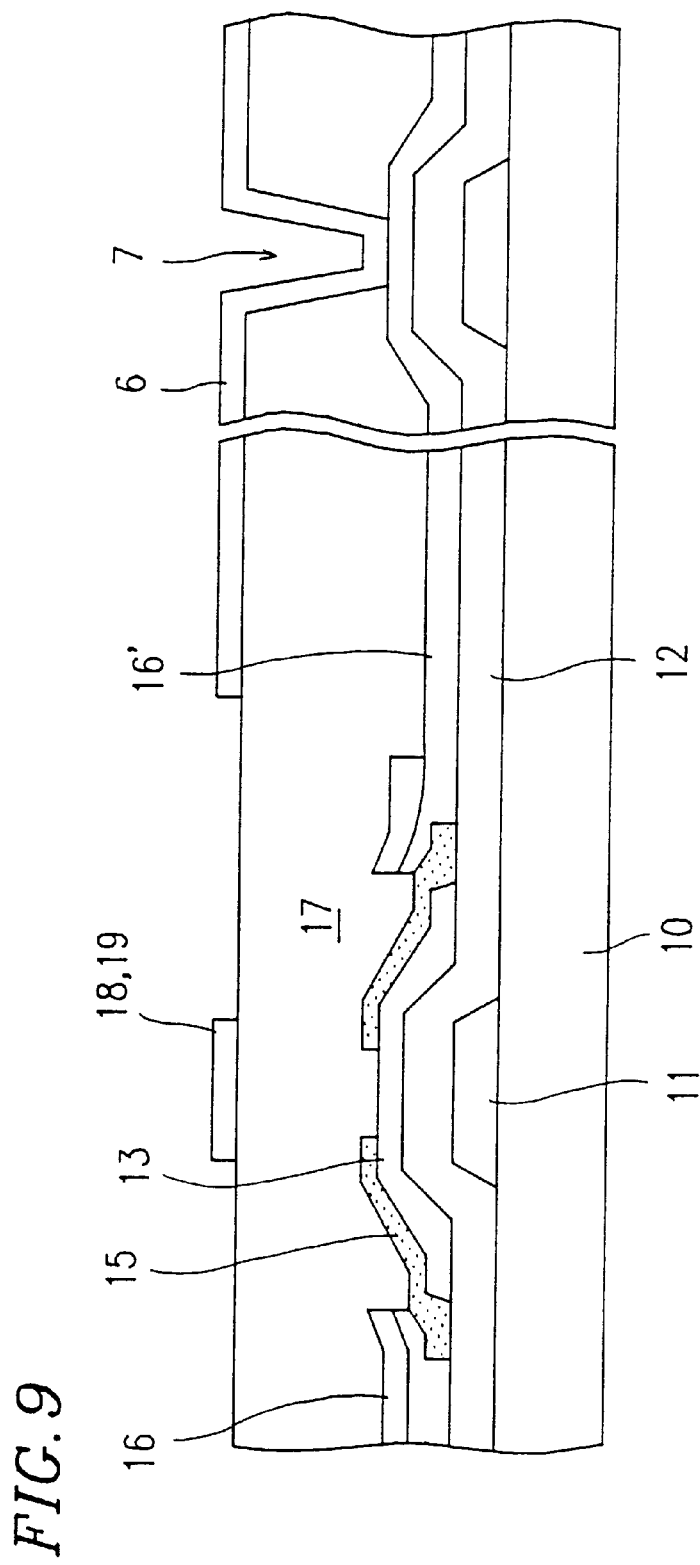
FIG. 9 is a cross-sectional view illustrating another active matrix substrate according to Example 4, showing a portion thereof corresponding to that shown in FIG. 3.
Figure 10:
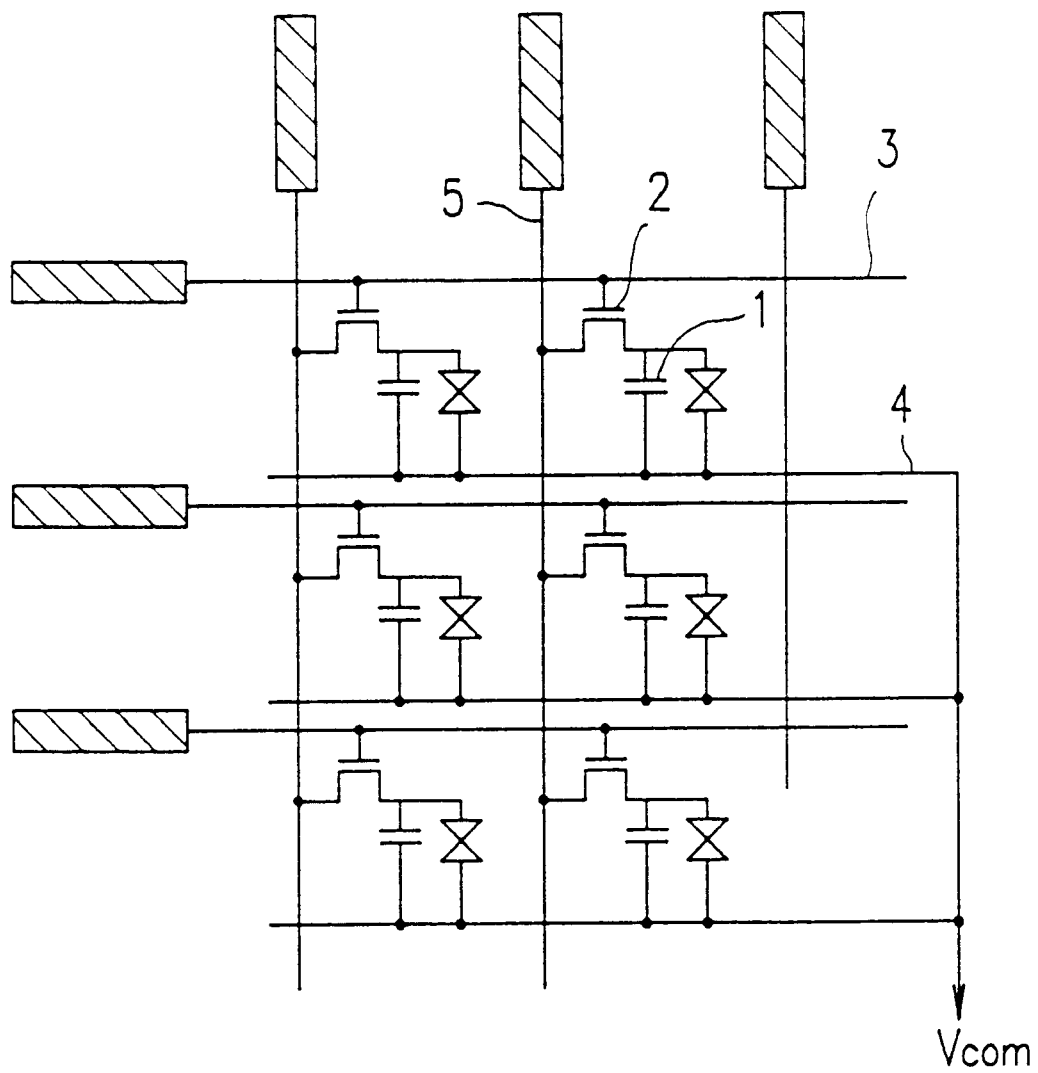
FIG. 10 is an equivalent circuit showing the constitution of an active matrix substrate as a portion of a liquid crystal display device including TFTs.

The cross-sectional structure of the active matrix substrate of the present example will be described with reference to FIGS. 8 and 9. It will be appreciated that the present invention is applicable not only to an active matrix substrate having a TFT structure including the channel protection film 14 but also to an active matrix substrate having a TFT structure without a channel protection film, in embodiments according to any of Examples 1 to 3. The inventors confirmed through experiments that the reliability of the active matrix substrate similarly improved without a channel protection film as well as in the case where a channel protection film is provided.

EXAMPLE 5

Figure 12:
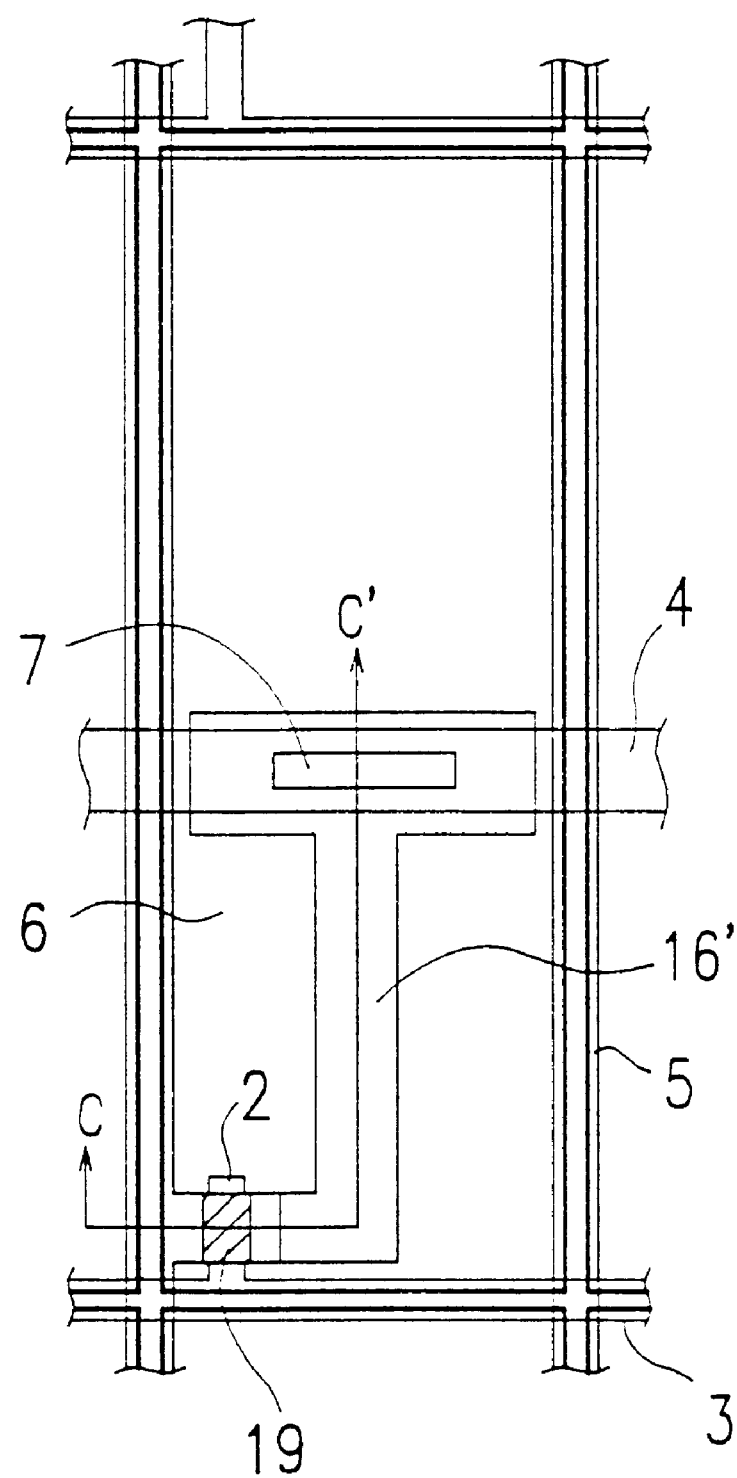
FIG. 12 is a plan view illustrating an active matrix substrate according to Example 5 of the present invention.
Figure 13:
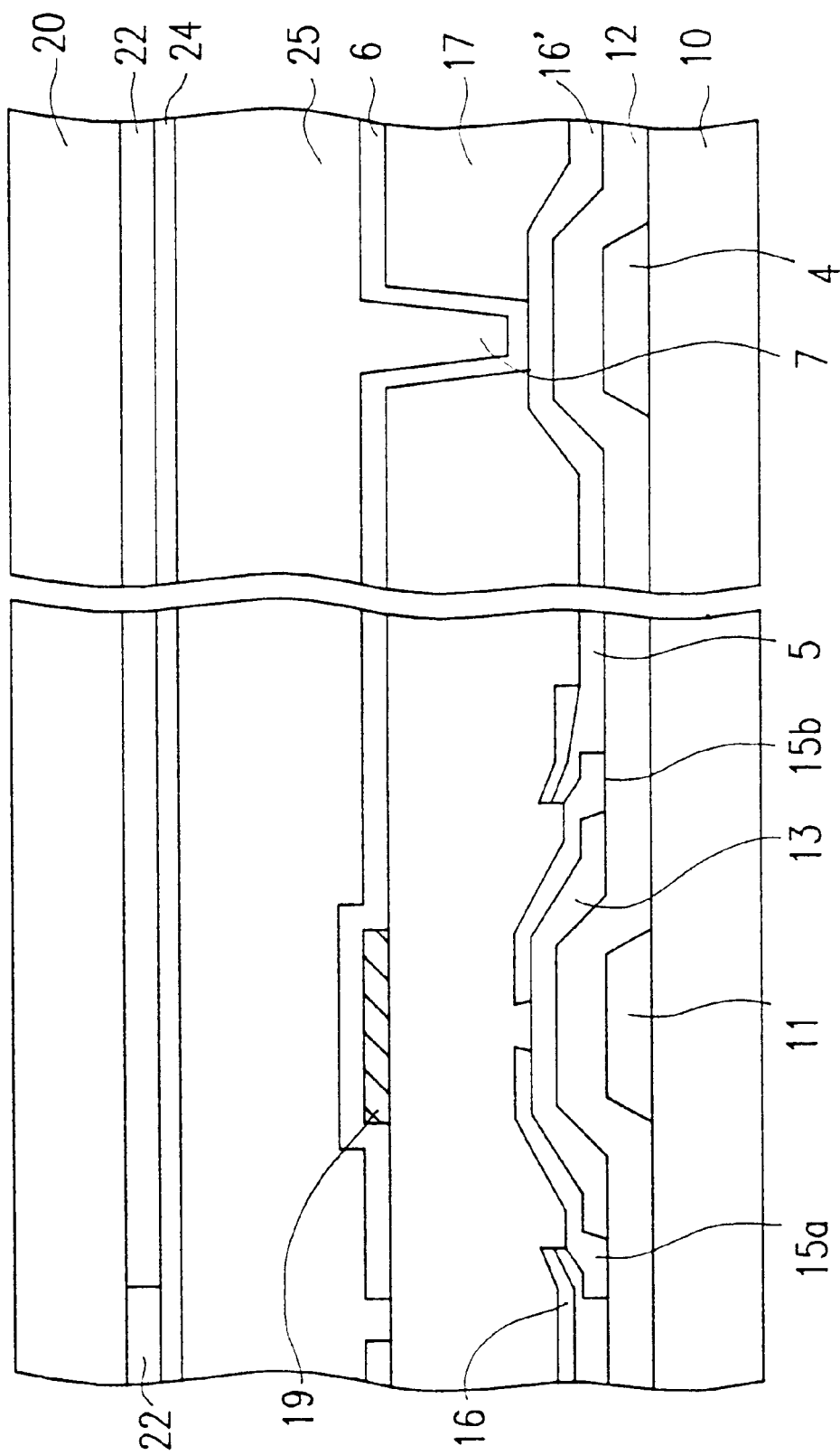
FIG. 13 is a cross-sectional view (taken at line C–C' in FIG. 12) illustrating a liquid crystal display device incorporating the active matrix substrate shown in FIG. 12.
Figure 14:
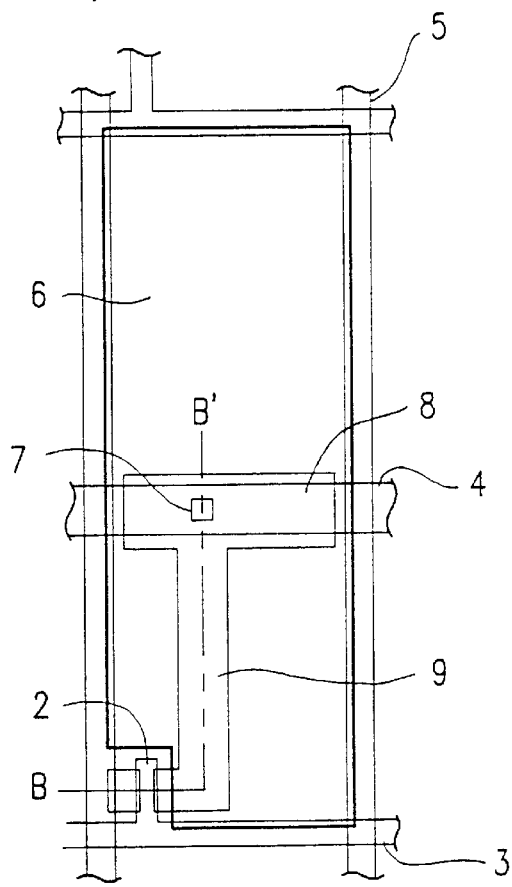
FIG. 14 is a plan view illustrating an active matrix substrate.
Figure 16:
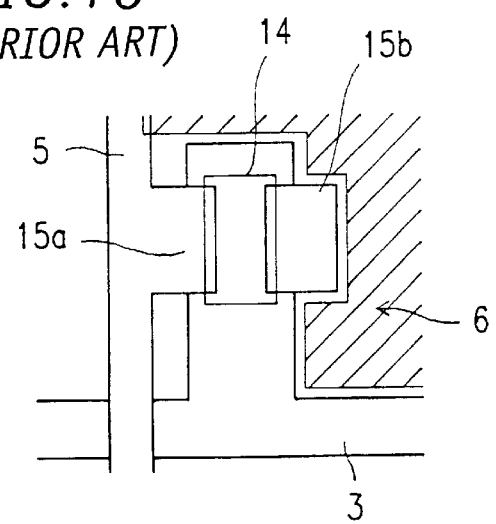
FIG. 16 is a plan view illustrating a TFT portion of an active matrix substrate.
Figure 15:
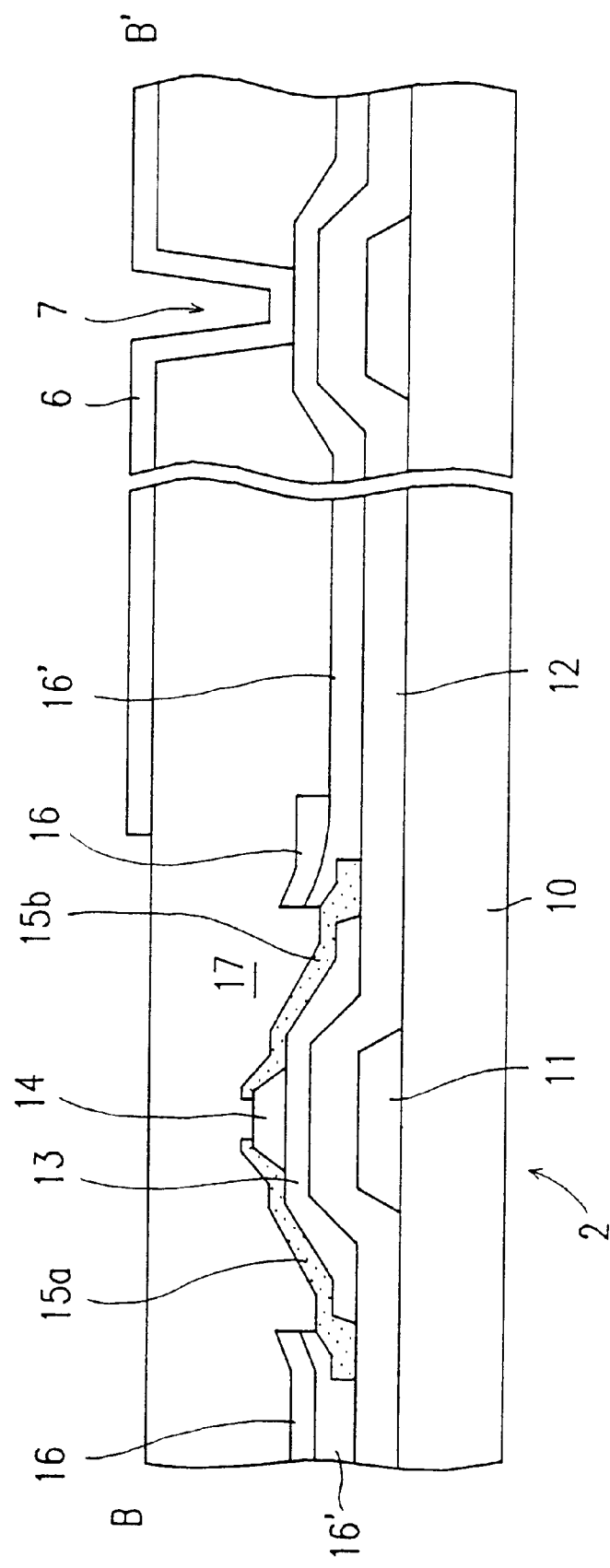
FIG. 15 is a cross-sectional view taken at line B–B' in FIG. 14 showing an active matrix substrate.

Hereinafter, an active matrix substrate according to Example 5 of the present invention will be described with reference to FIGS. 12 and 13. FIG. 12 is a plan view showing the active matrix substrate of the present example. FIG. 13 is a cross-sectional view illustrating a liquid crystal display device incorporating the active matrix substrate shown in FIG. 12.

In the active matrix substrate of the present example, a pixel electrode 6 is formed in a manner similar to the manner the pixel electrode 6 of Example 1 is formed, and a separate electrode 19 formed of a metal film is provided so as to cover at least the channel region of a TFT 2, the electrode 19 thus intercepting light in the channel region of the TFT 2. The active matrix substrate otherwise has the same construction as that of the active matrix substrate of Examples 1 and 3.

According to the present example, not only the metal electrode 19 can intercept light in the channel region of the TFT 2, but also the patterning of the pixel electrode 6 is facilitated. Moreover, the pixel electrode 6 at least partially overlaps the source line 5 and the gate line 3 in a peripheral portion thereof. Therefore, as shown in FIG. 13, it is possible to form a color filter layer 22 which does not have any black masks on a counter substrate 20. In other words, light from the periphery of the pixel electrode 6 is intercepted by the gate line 3 and the source line 5, so that there is no need to provide a black mask on the counter substrate 20. Furthermore, the metal electrode 19 intercepts light in the channel region of the TFT 2. The liquid crystal display device shown in FIG. 13 is of a transmission type with the counter substrate 20 being at the front face side (i.e., the face observed by a viewer). Moreover, the metal electrode 19 further alleviates (relative to Example 1) the charge-up phenomenon as in the case of Example 2 (where the separate electrode 18 formed of a transparent conductive film was used), thereby improving the reliability of the active matrix substrate.

Although an organic film is used as the interlayer insulating film in Examples 1 to 5, the present invention also accepts an interlayer insulating film formed of an inorganic film (e.g., a silicon oxide film and a silicon nitride film) for providing similar advantages. Although the above-mentioned deterioration in the OFF-characteristics of TFTs would be most prominent in the case where an organic film is used as the interlayer insulating film, the present invention similarly reduces the relatively small deterioration in the OFF-characteristics of TFTs in the case where an inorganic film (described above) is used as the interlayer insulating film.

The use of an organic material for the interlayer insulating film provides the following advantages over an inorganic interlayer insulating film. Since organic materials have a low dielectric constant relative to that of inorganic materials, the use of an organic interlayer insulating film minimizes the capacitance formed between and any two conductive layers (e.g., electrodes and wires) opposing each other via the interlayer insulating film. It is also relatively easy to form a thick film of an organic material by using application methods such as spin coating. The thickness of the organic film is preferably about 1.5 $\mu$m or more in order to reduce the above-mentioned capacitance. Examples of preferable organic materials include acrylic resins or polyimidetype resins having excellent transparency in the visible spectrum.

Although not particularly described above, the electrode covering the channel region can be grounded or coupled to a counter electrode without undermining the effects of the invention.

It will be appreciated that the present invention is applicable not only to inverse-staggered TFTs as described in each Example but also to staggered TFTs.

Although the TFT described in any of the above Examples has a channel region corresponding to the entire semiconductor layer, the present invention is similarly applicable to a TFT whose channel region corresponds to only a portion of the semiconductor layer. In that case, the same effects can be attained by providing a predetermined electrode so as to cover such a channel region.

As described above, according to the present invention, a channel region of a TFT, which is formed in the vicinity of an intersection of a gate line and a source line, is covered by a pixel electrode or alternatively by a separate electrode formed on an interlayer insulating film. As a result, the deterioration in the OFF-characteristics of the TFT during the application of a voltage thereto can be minimized. Thus, the life of the substrate is improved, and high reliability with a large margin in the OFF-characteristics can be provided. As a result, the "haziness" phenomenon due to any shift in the OFF-characteristics of the TFTs can be prevented, thereby leading to higher display quality. By employing a metal layer as the electrode covering the channel region of the TFT, leakage of light in the channel region of the TFT can be effectively prevented. By further ensuring that the pixel electrode at least partially overlaps the source line and the gate line in a peripheral portion thereof, it becomes possible to realize a color display device employing a color filter which does not require a black matrix.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An active matrix substrate used in a display device comprising:
   a gate line;
   a source line;
   a thin film transistor (TFT) provided in the vicinity of an intersection between the gate line and the source line, the thin film transistor including a gate electrode connected to the gate line, a source electrode connected to the source line, a drain electrode, and a channel region;
   an interlayer insulating film having a planer surface provided over the thin film transistor, the gate line, and the source line, wherein the interlayer insulating film is an organic film;
   a transparent pixel electrode provided on the planer surface of the interlayer insulting film and connected to the drain electrode via a contact hole formed in the interlayer insulating film, wherein the pixel electrode is formed of a transparent conductive material through which light passes during operation of the display device and the pixel electrodes having edges overlapping the gate and source lines; and
   a conductive layer formed over the channel region of the thin film transistor via the interlayer insulating film to minimize deterioration of an OFF-characteristic of the thin film transistor resulting from extended application of voltage to the thin film transistor.

2. An active matrix substrate according to claim 1, wherein the conductive layer is electrically connected to the drain electrode.

3. An active matrix substrate according to claim 1, wherein the conductive layer is set at a same potential as the source electrode.

4. An active matrix substrate according to claim 1, wherein the conductive layer is in a floating state.

5. An active matrix substrate according to claim 1, wherein the conductive layer is formed of a transparent conductive material.

6. An active matrix substrate according to claim 1, wherein the conductive layer is formed of a light-intercepting conductive material.

7. An active matrix substrate according to claim 1, wherein the conductive layer is formed of a portion of the pixel electrode.

8. An active matrix substrate according to claim 1, wherein the conductive layer is formed so as to at least partially overlap both the source electrode and the drain electrode via the interlayer insulating film.

9. An active matrix substrate according to claim 1, wherein the interlayer insulating film is formed of an organic material.

10. A display device comprising: an active matrix substrate according to claim 1, a display medium layer, and a counter substrate, the counter substrate opposing the active matrix substrate with the display medium layer interposed therebetween.

11. An active matrix substrate according to claim 10, wherein the counter substrate comprises a color filter layer which does not include a black matrix.

12. An active matrix substrate according to claim 1, wherein a thickness of the interlayer insulating film is about 1.5 micrometers or more.

13. An active matrix substrate used in a display device comprising:
    a gate line;
    a source line;
    a thin film transistor provided in the vicinity of an intersection between the gate line and the source line, the thin film transistor including a gate electrode connected to the gate line, a source electrode connected to the source line, a drain electrode, and a channel region;
    an interlayer insulating film provided over the thin film transistor, the gate line, and the source line, wherein the interlayer insulating film is formed of an organic material; and
    a transparent pixel electrode provided on the interlayer insulating film and connected to the drain electrode via a contact hole formed in the interlayer insulating film, wherein the pixel electrode is formed of a transparent conductive material through which light passes during operation of the display device and the pixel electrodes having edges aligned with the source and gate lines, and the pixel electrode extending from the contact hole to over the channel region of the thin film transistor.

14. An active matrix display substrate according to claim 13, wherein a thickness of the interlayer insulating film is about 1.5 micrometers or more.

15. An active matrix display substrate according to claim 13, wherein the pixel electrode at least partially overlaps both the source electrode and the drain electrode via the interlayer insulating film.

16. An active matrix display substrate according to claim 13, comprising:
    a display medium layer and a counter substrate, the counter substrate opposing the active matrix substrate with the display medium layer interposed therebetween.

17. An active matrix display substrate according to claim 13, wherein the counter substrate comprises a color filter layer which does not include a black matrix.

18. An active matrix substrate used in a display device comprising:
    a gate line;
    a source line;
    a thin film transistor (TFT) provided in the vicinity of an intersection between the gate line and the source line, the thin film transistor including a gate electrode connected to the gate line, a source electrode connected to the source line, a drain electrode, and a channel region;
    an interlayer insulating film having a planer surface provided over the thin film transistor, the gate line, and the source line, wherein the interlayer insulating film is an organic film;

a transparent pixel electrode provided on the planer surface of the interlayer insulting film and connected to the drain electrode via a contact hole formed in the interlayer insulating film, wherein the pixel electrode is formed of a transparent conductive material through which light passes during operation of the display device and the pixel electrodes have edges aligned with and overlapping the gate and source lines, and a conductive layer formed over the channel region of the thin film transistor via the interlayer insulating film.

19. An active matrix substrate used in a display device comprising:

a gate line;

a source line including;

a thin film transistor provided in the vicinity of an intersection between the gate line and the source line, the thin film transistor including a gate electrode connected to the gate line, a source electrode connected to the source line, a drain electrode, and a channel region;

a transparent conductive film connected to the drain electrode;

an interlayer insulating film having a planer surface provided over the thin film transistor, the gate line, the source line, the pixel capacitive line and the wherein the interlayer insulating film is formed of an organic material, a transparent and conductive pixel electrode provided on the planer surface of the interlayer insulating film having edges aligned with and overlapping the gate and source lines, and connected to the transparent conductive film via a contact hole formed in the interlayer insulating film;

a pixel capacitive line separated from the pixel electrode by the interlayer insulating film and aligned with the contact hole in the pixel electrode, wherein the transparent conductive film extends from the drain electrode to the capacitive line and overlaps the capacitive line to connect to the pixel electrode at the contact hole.

* * * * *